United States Patent
Lay et al.

(10) Patent No.: US 7,456,991 B2
(45) Date of Patent: Nov. 25, 2008

(54) PRINTER BASED FILE REVISION DATABASING

(75) Inventors: Daniel Travis Lay, Horseshoe Bend, ID (US); Curtis Reese, Boise, ID (US); John Hatten, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 10/418,714

(22) Filed: Apr. 18, 2003

(65) Prior Publication Data

US 2004/0207868 A1    Oct. 21, 2004

(51) Int. Cl.
G06F 15/00  (2006.01)
G06K 1/00   (2006.01)

(52) U.S. Cl. ..................... 358/1.16; 358/1.15

(58) Field of Classification Search ........... 358/1.1, 358/1.9, 1.11–1.18; 709/200, 221; 717/107, 717/168, 170, 171, 173, 178; 707/1, 2, 3, 707/9, 10, 100, 104.1, 203, 205
See application file for complete search history.

(56) References Cited

U.S. PATENT DOCUMENTS

| | | | |
|---|---|---|---|
| 6,333,790 B1 * | 12/2001 | Kageyama | 358/1.15 |
| 7,076,496 B1 * | 7/2006 | Ruizandrade | 707/102 |
| 2002/0140966 A1 * | 10/2002 | Meade et al. | 358/1.15 |
| 2004/0179216 A1 * | 9/2004 | Reese et al. | 358/1.11 |

* cited by examiner

*Primary Examiner*—Dov Popovici
*Assistant Examiner*—Thierry L Pham

(57) ABSTRACT

The present disclosure relates to modifying files that are part of file system in a printer or printing device. The file system is related to a database, such that the database is updated when the file system is modified. Changes to the files system are made through a request, modifying the file system based on the request, and updating the database. Individual files make up programs that may be provided by a printer manufacturer or a third party solution provider. When the printer manufacturer or solution provider desires to modify files affecting a program, a query may be made as to the existing files in the database of the particular printer.

14 Claims, 6 Drawing Sheets

PRINTER BASED FILE REVISION DATABASING

TECHNICAL FIELD

The present disclosure relates to printers, and more particularly, determining and tracking software revisions of applications executing on printers.

BACKGROUND

Certain printers, printing devices, and multifunction peripherals (MFP) (collectively known as "printers") incorporate an Internet-enabling technology into their firmware. An example is Hewlett Packard's Chai™ appliance infrastructure. The Chai™ appliance infrastructure includes several enabling components, including ChaiServer™ that is an embedded web server (EWS), and ChaiVM™ that is an embedded virtual machine (EVM). The ChaiServer™ enables a printer to be accessed over the Internet via an Internet browser using standard protocols such as hyper-text transfer protocol (HTTP), and further provides an environment in which web programs can be executed. The output of these web programs can then be displayed on a web browser for use by a printer's user. The ChaiVM™ provides an execution environment for Java programs that make use of industry standard application programming interfaces (APIs) to enhance printer functionality.

An example of a printer application is the Chai™ Advanced Device Information Solution (ADIS) 100 remote printer management solution developed by Euroform. This printer application allows a printer to process email requests for device status, and return an email message with the requested device status information. Another printer application is Chai™ AutoPrint WebSource by DataScan. This printer application enables a printer to automatically retrieve and print web pages according to a predefined time interval. Yet another example of a printer application is the Remote Firmware Upgrade utility (RFU) from Hewlett-Packard. This web-based application interacts with a printer's Chai server to update the printer's existing firmware components. Users can initiate an upgrade session with the RFU by navigating to the printer's home page and clicking on a web link that requests an upgrade process from a HP-supplied web site.

Printer applications are usually stored on a writeable memory device, such as a hard disk, single inline memory module (SIMM), a dual inline memory module (DIMM), compact flash module, etc. These memory devices are typically controlled by a firmware module that is capable of formatting the media as a file system. In this way, files can be added, removed and modified from the media similar to the way files are managed by an Operating System executing on a desktop computer. A printer manufacturer and/or a third party solution provider installs printer solutions using a designated software installation interface that, in turn, stores the application files on the appropriate writeable memory device.

ChaiServer™ provides programmatic interfaces for application installation. These interfaces can be accessed via several methods including use of a web browser-based application using HTTP commands that are processed by the ChaiServer™ component. In this way, printer applications can be installed via the Internet or Intranet, depending upon the printer's network configuration. The ChaiServer™ works with other system components to store the application file on the appropriate writeable memory device that is coupled directly or indirectly to the printer.

With the ability to provide printers with different application programs and firmware updates, it is expected that incompatibility may arise between an application program and a printer's updated firmware components. This is a concern when a third party solution provider attempts to download or install software to the printer. Without detailed knowledge of the current software that is installed on the printer, in particular the version information of each firmware component, the version information of each application component from an existing installation, and the version information of each printer firmware component, a third party solution provider is not able to adequately determine if the proposed software will execute properly after it is installed.

Typically, when a printer manufacturer and/or third party solution provider desires to modify or determine status of software, particularly application programs, of a printer, there may be insufficient information that is provided by the printer. When software is loaded to a printer, changes or revisions are not tracked. Software files that are modified, added, and/or deleted are not recorded. There may be hundreds of affected software files in a file system of the printer. In certain cases, it may be possible to track modified, added, or deleted files in firmware; however, this usually only involves retrieving a printer status page. In certain cases, the status pages may not contain sufficient information as to the hundreds of affected software files. Therefore when software, in particular an application program, is modified, an entire version of the application program is sent, not just a portion needed to perform the change.

Accordingly, this invention arose out of concerns associated with the ability to determine and track software changes that are made to a printer or printing device, and to allow parties to view such changes in order to provide new or revised software to the printer or printing device.

SUMMARY

The systems and methods described herein include modifying a file system in printer by receiving requests from various parties. When the file system is modified, a database is updated. The database describes and tracks interrelationship of files in the file system, and may be queried as to particular files meeting particular conditions.

Certain systems and methods described include providing the ability of a third party solution provider to query the printer database using known query commands such as structured query language (SQL).

In particular embodiments, a file structure defines the organization of the files in the file system and the database is tied with the file structure.

BRIEF DESCRIPTION OF THE DRAWINGS

The drawings that are shown and described are to illustrate embodiments and/or implementations of the invention, and are not of the invention itself.

DETAILED DESCRIPTION

Exemplary System

Figure 1:
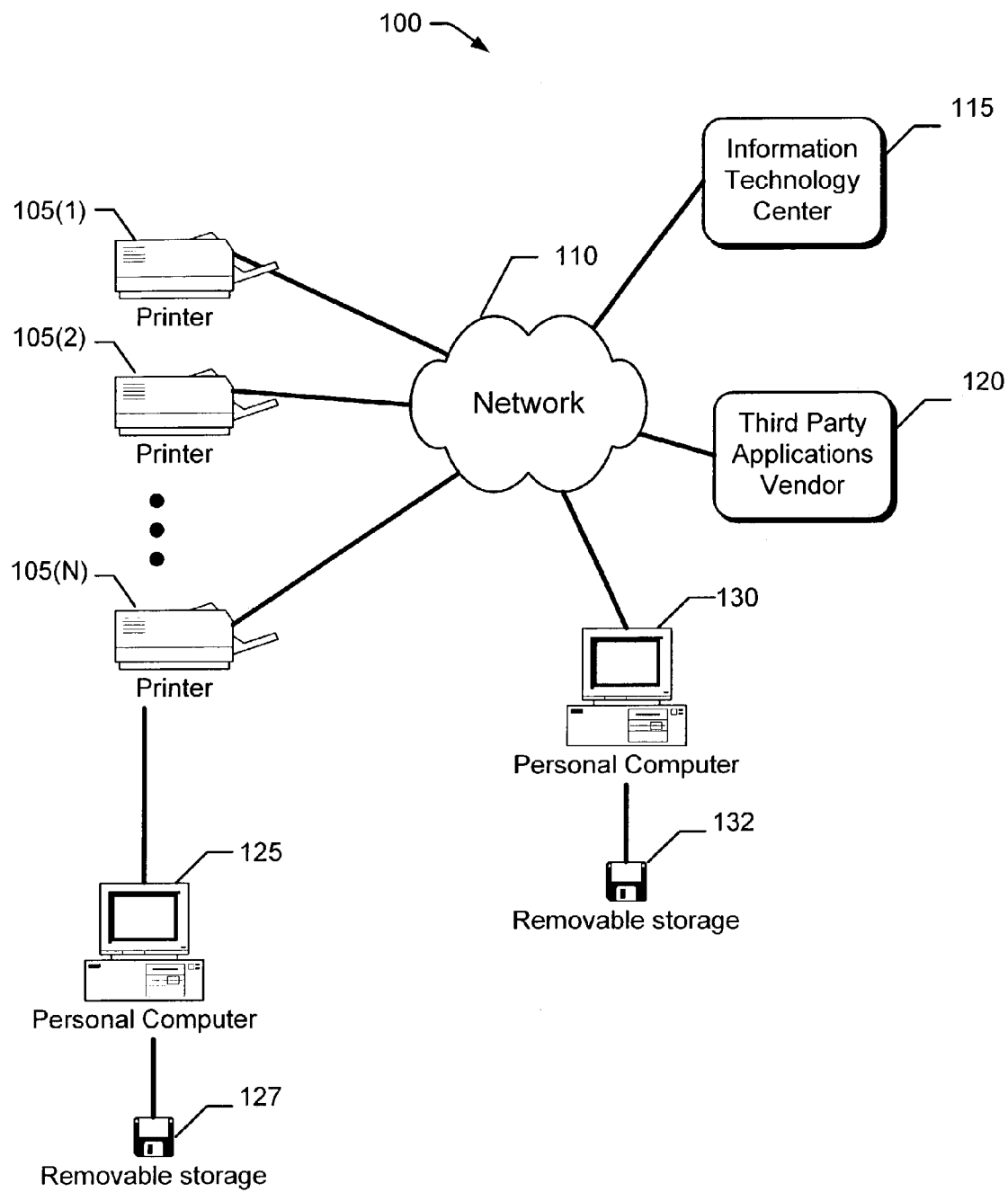
FIG. 1 is a block diagram illustrating an exemplary network system that provides and tracks software that is sent to various printers.

FIG. 1 shows an exemplary system 100 to provide software to printers. A number of printers 105(1)-105(N) may be configured to receive and store application programs and software files associated with application programs and software solutions (collectively referred to as "software"). As used herein, "printers" include dedicated and networked printers that use various printing mechanisms (e.g. inkjet, laser, etc.), as well as printing devices (e.g. multi function peripherals, scanners, etc.) that read and provide electronic or hard copy documents.

Printers 105(1)-105(N) may be part of a local area network (LAN), a wide area network (WAN), a public network, a corporate network, or various other types of networks. In certain cases, printers 105 (1)-105(N) are not part of network and are dedicated units. However, dedicated units may be able to connect to a network such as the Internet through an interface provided by a device such as a personal computer (PC).

In this example, a network 110 is connected to printers 105(1)-105(N). Network 110 may include various intra and inter networks including the Internet. Network 110 may further be connected to an information technology (IT) center 115. IT center 115 through network 110, provides, tracks changes to, and deletes application programs and files located on printers 105(1)-105(N).

Third parties application venders, such as solution provider 120 distribute software to printers 105(1)-105(N) to perform various functions, such as downloading fonts and forms. Solution provider 120 may have its installation infrastructure configured to receive information from printers 105(1)-105(N). Such information provided by a printer may include description as to software and software files that are resident at a particular printer.

Printers 105(1)-105(N) may be directly connected through a Centronics parallel interface, serial interface, a universal synchronous bus (USB) interface, or similar direct connection to a computing device such as a PC. In this example, a PC 125 allows a user to download application programs directly to printer 105(N). Software may be received in the form of a removable storage medium 127 that includes optical disks, compact flash disks, floppy disks, and similar transportable computer readable media. PC 125 further allows a user to determine, through the direct interface with printer 105(N), printer status or condition including assessing particular application programs resident on printer 105(N).

Printers 105(1)-105(N) may also be accessed by remote PC 130 which is connected to network 110. PC 130, similar to PC 125, is configured to receive application programs in the form of a removable storage medium 132 that includes optical disks, compact flash disks, floppy disks, and similar transportable computer readable media. PC 130 allows a user to determine printer status or condition including assessing particular application programs resident on printers 105(1)-105(N).

Exemplary Printer Architecture

Figure 2:
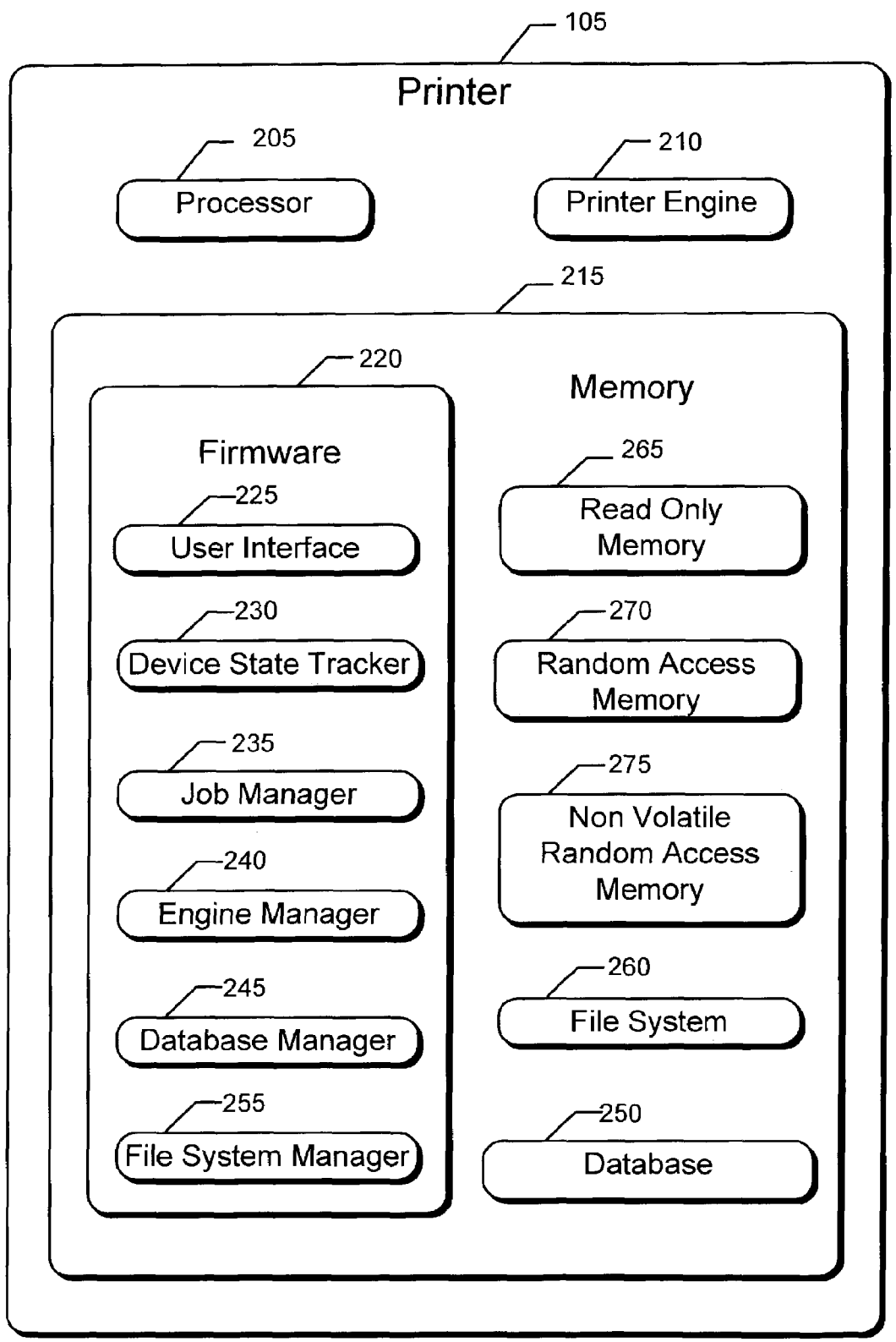
FIG. 2 is a block diagram illustrating an exemplary architecture that provides for downloading and tracking software and software file changes through a database.

FIG. 2 shows a printer architecture that accepts and tracks software. Such a printer architecture may be implemented for a printer such as a printer 105 of FIG. 1. In this example printer 105 includes a processor 205 and a printer engine 210 coupled to a memory 215. Printer engine 210 generally is configured for use in rendering received document and image data to a printed hard copy output. For example, printer engine 210 controls a printer head, a laser unit, or other mechanical means used in creating the printed hard copy output.

Memory 215 includes a number of program modules. In this example memory 215 includes a programmable firmware module 220. Firmware module 220 includes modules, which may or may not be written to (i.e., updated). However, the modules of firmware module 220 may be read from. In certain embodiments firmware module 220 is separate from memory 215, and maintains a separate coupling to processor 205 and printer engine 210.

Firmware module 220 includes a user interface module 225, a device state tracker module 230, a job manager module 235, an engine manager module 240, a database manager module 245, and a file system manager module 255. Firmware module 220 and its modules are operatively coupled to other modules of memory 215.

User interface module 225 receives instructions from a user, an IT center, or other party to initiate download or receipt of software to printer 105. Device state tracker module 230 tracks software and software file replacements, deletions, and additions (collectively referred to as "modifications") performed at printer 105. Job manager module 235 controls print jobs or printing of copies to be sent to and performed by processor 205. Engine manager module 240 controls programs that are sent to and performed by printer engine 210. Database manager module 245 tracks modifications of entries to a database module 250. File system manager module 255 receives file system requests (i.e., actions affecting a file system module 260), initiates a corresponding file system task to be performed on a file system contained on the file system module 260, and provides a notification to the device state tracker module 230. File system changes specifically include modifications to software files, which make up the file system.

Further included in memory 215 are read only memory (ROM) module 265, random access memory (RAM) module 270, and nonvolatile random access memory (NVR) module 275. NVR module 275 is used to store printer configuration state information such as interconnections to other devices such as PCs. This eliminates the need for a user and/or other devices to identify and/or re-establish themselves with the printer 105. ROM module 265 and NVR module 275 continue to store information even when power is shut down from printer 105, while RAM module 270 loses information as soon as printer 105 loses power.

When downloading software, including software files, printer 105 may make use of RAM module 270, and file system module 260. File system module 260 is a form of temporary memory that is programmable (i.e., write to and read from). In typical cases, software files may be loaded from transportable medium onto a section of file system module 260 then loaded onto RAM module 270 when printer 105 is booted up (i.e., started). If memory is insufficient in RAM module 270 at boot up, RAM module 270 places software into file system module 260. RAM module 270 is used as transitory memory to place software (including software files), printer operating system, and other printer related programs prior to sending them to processor 205. Since software is stored and continuously processed, eventually RAM module 270 frees up enough memory to be able to download software that was previously stored in file system module 260. The software is then sent by RAM module 270 to processor 205.

In certain cases, file system module 260 and database module 250 are combined. Database module 250 defines the interrelationship of files and directories as part of a file structure that is defined by the file system module 260. This is further discussed below.

It is contemplated that an embedded operating system is used by printer 105. Such an operating system may be placed in NVR 275 or a dedicated section of memory 215. Initially or when updates are performed, the operating system is loaded from an external medium. As discussed above, at boot up the operating system is placed in RAM module 270 prior to processing by processor 205. A number of operating systems may be used, including Unix and Linux, and their variations. The particular choice of an operating system lies in the ability to provide a file structure that allows a user to perform query commands as to the software files defined by the file structure.

File Structure

Figure 3:
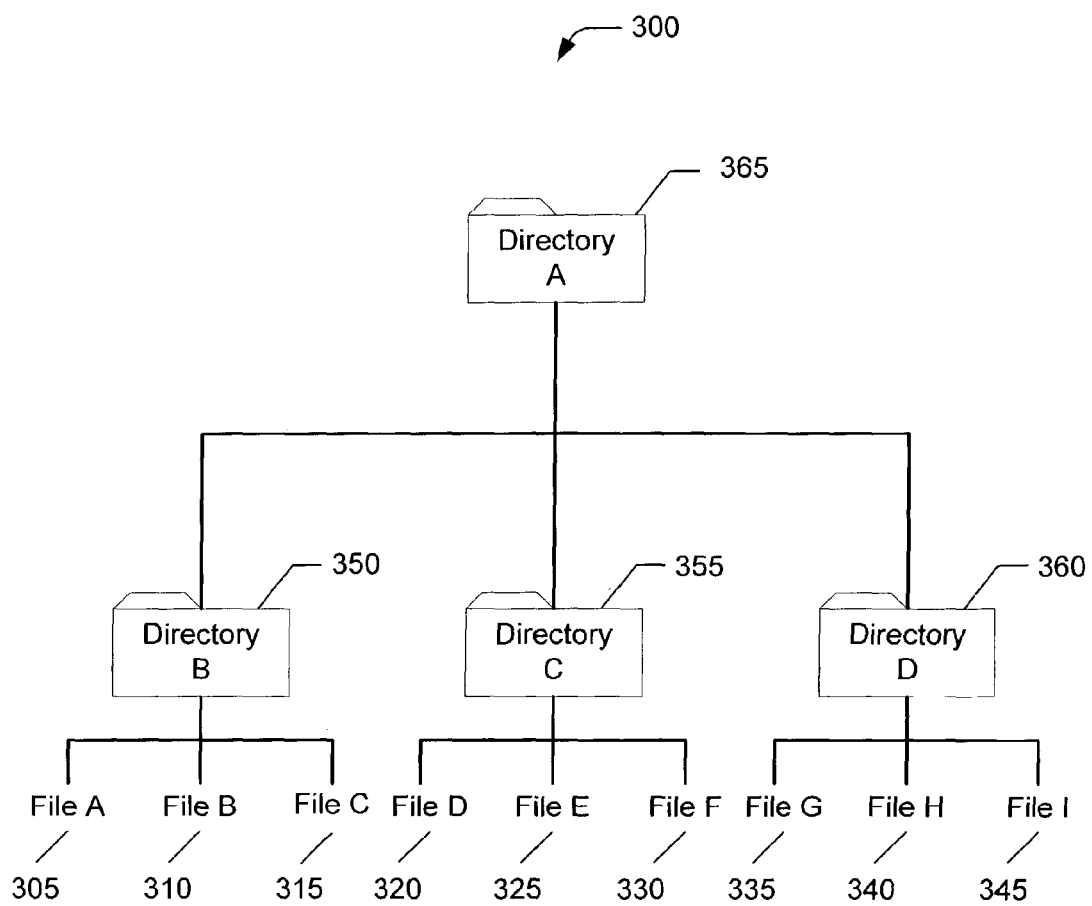
FIG. 3 is a block diagram illustrating an exemplary file structure for a file system.

FIG. 3 shows an example file structure 300 that may be employed in file system module 260 of FIG. 2. Software files and directories are organized into a file system that is embodied in a file system module 260. Such a file system may be organizationally defined by a file structure such as file structure 300. Specifically, files are organized into higher level folders or directories that may be organized into higher level directories, creating a structured hierarchal relationship of files and directories.

A file contains information that may include text strings, printer commands, machine and/or user interfaces, assignable rights to a party (e.g., solution provider and/or user), and data format. An extension (i.e., suffix) to the file name may be used to describe the type of the file. For example, a ".txt" extension would indicate a text file. A directory of files makes up executable software to perform a printer function or operation. An application program that provides functionality to the printer may place, and make use of, particular files into specific directories. In running the application program, the particular files are looked for, loaded into RAM module 270, and processed.

In this example, file system structure 300 includes a number of files: File A 305, File B 310, File C 315, File D 320, File E 325, File F 330, File G 335, File H 340, and File I 345. Directory B 350 is made up of File A 305, File B 310, and File C 315. Directory C 355 is made up of File D 320, File E 325, and File F 330. Directory D 360 is made up of File G 335, File H 340, and File I 345. At the next higher level, directory A 365 is made of directory B 350, directory C 355 and directory D 360.

Although, file structure 300 illustrates files as part of particular directories, it is contemplated that one or more files may be part of one or more directories. In other words, a particular file may be shared between multiple directories. Likewise, in file structures with a number of levels of directories, lower level directories may be shared amongst more than one higher-level directory. Also, files and directories at different levels may be shared with higher-level directories.

A file may be referenced by a path name that defines the directories that include the file. For example, a particular drive or memory, drive "G", contains the directories and the files associated with file structure 300. The pathname for File A 305 would be G:directory A/directory B/file A. File A 305 may further include an extension that describes the file type.

Exemplary Database Entity Relationship

Figure 4:
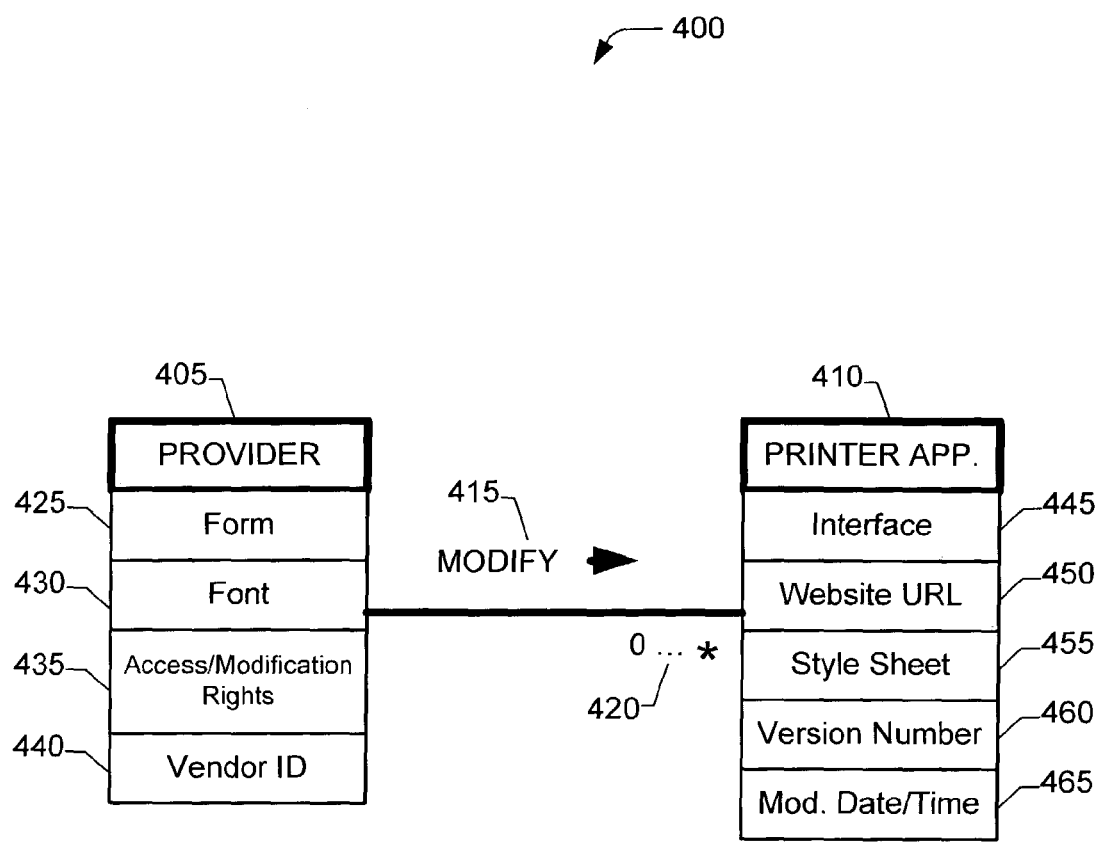
FIG. 4 is a block diagram of an example database entity relationship of providers and printer application programs.

FIG. 4 shows an example database relationship 400 of solution providers and application programs. Database relationships may be employed in database module 250 of FIG. 2. Third parties (e.g. solution providers) and a printer manufacturer (collectively referred to as "providers") may be defined by a table 405 as particular entities. Printer application programs may be defined by table 410 as particular entities. Therefore, entities defined by table 405 relate to entities defined by table 410.

A number of actions may be performed by providers that affect a printer application program. In this example the action "modify" 415 defines the particular action of a provider 405 table entry on a printer application program 410 table entry. The arrow of modify 415 action indicates that the provider of table 405 performs the action on the printer application program of table 410.

A number of entities may relate to a number of other entities. In this example entity relationship "0 . . . *" 420 indicates that a particular provider can relate to zero (0) to many (*) printer application programs.

A provider is defined by a number of fields as included in table 405. The values of the fields may be defined by particular software files. In this example a provider is defined by a form field 425 that defines a particular form generated by the provider. A provider may be defined by a font field 430 that defines a particular font from by the provider. A provider may be defined by the access or modification rights associated with it as provided by access/modification rights field 435. Providers may be defined by a provider ID value in provider ID field 440. In certain cases when a field is not applicable to a provider, the value in the field may be set to "null."

An application program may be defined by a number of fields as included in table 410. Particular files, such as files 305-345 of FIG. 3 may provide values of the particular fields of table 410. In other words, files provide data in the fields that define application programs. The values of the fields may be defined by particular software files. An application program may have a particular user interface as defined by interface field 445. A particular website URL may apply to the printer application program and defined by website URL field 450. A printer application program may have a style sheet associated with it and defined by a style sheet field 455. A printer application program may have a version number as defined by a version number field 460. The particular date and time that a printer application program was modified may be defined by a modification date/time field 465. In certain cases when a field is not applicable to a printer application program the value in the field may be set to "null."

The above entity relationship is provided as an example. Other relationships between providers, application programs, and other entities may exist. Such entity relationships are used to define how particular fields and particular software files that define the values of such fields, relate to particular entities as part of a relational database. With a relational database, the use of database query commands can be used by a provider to the printer, a user of the printer, or an IT center managing the printer.

Examples of database query languages include structure query language (SQL) and variations of SQL. SQL is well known in the industry and query commands using SQL may be generated without detailed knowledge of the printer operating system and printer software architecture. Searches may be performed keyed to particular fields, where search results may be structured to described directories and/or entities affected by the particular fields.

File System Modification and Database Update

Figure 5:
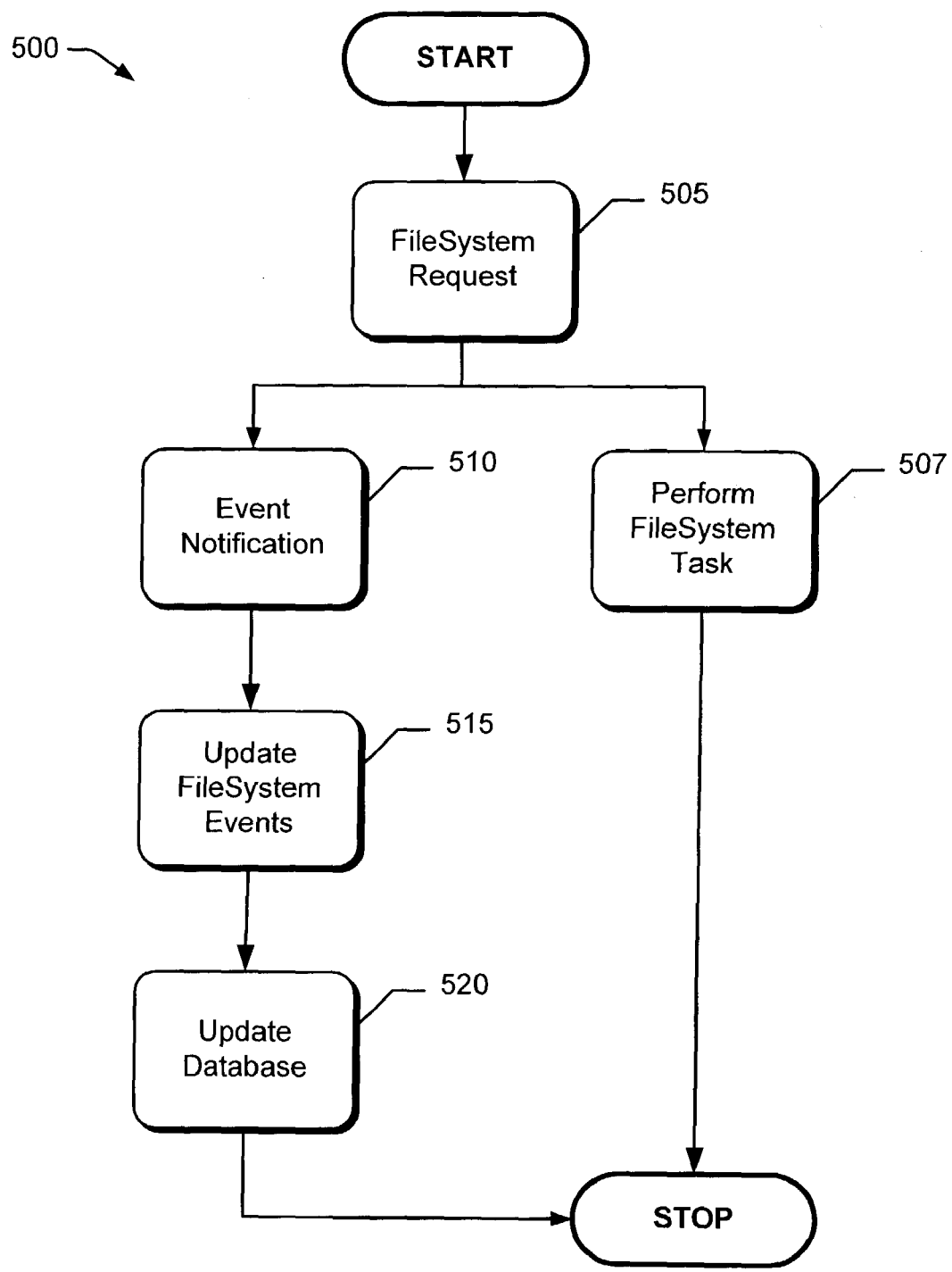
FIG. 5 is a flowchart illustrating performing changes and tracking software files that are processed through a file system.

FIG. 5 shows a process 500 that performs and tracks changes to a file system in a printer. Blocks of process 500 represent computer executable instructions that may be performed on a printer or printing device.

At block 505, a request is initiated to modify or perform a change on the file system. In particular, the request is to add, delete or replace a software file or files that are part of the file system. The particular files are associated with application programs. File system module 260 of FIG. 2 may process the files. The request may be initiated by a user through user interface module 225 of FIG. 2. In other cases, the request is initiated from firmware modules such as job manager module 235 and/or engine manager module 240 of FIG. 2, when print jobs or programs are processed. The request may be sent to and received by file system manager module 255 of FIG. 2.

After the request is initiated, at block 507 a task is performed on file system module 260 by file system manager module 255. File system manager module 255 performs the task that changes the file system, which may be to add, delete or replace a file. The file may affect one or more application programs.

In parallel with block 507, an event notification is sent at block 510 indicating a modification affecting the file system. The event notification contains information as to specific changes made to an application program or other program affecting the file system (i.e., modifications to files). The event notification is sent by file system manager module 255 after receiving the request at block 505. The event notification is received by device state tracker module 230 of FIG. 2. As described above, device state tracker module 230 tracks software modifications performed at the printer.

At block 515, an update is performed to the relational database of the printer. When the file system is changed, database module 250 of FIG. 2 is affected. Database module 250 includes a printer database that includes information regarding the interrelationships of entities, fields, files, and directories. Device state tracker module 230 notifies database manager module 245 of FIG. 2 as to events that affect the file system and the printer database.

At block 520, the printer database, as defined by database module 250, is updated. The update is performed by providing a database entry or modification regarding particular affected files. The update may be performed by database manager module 245 on database module 250.

Database Extraction

Figure 6:
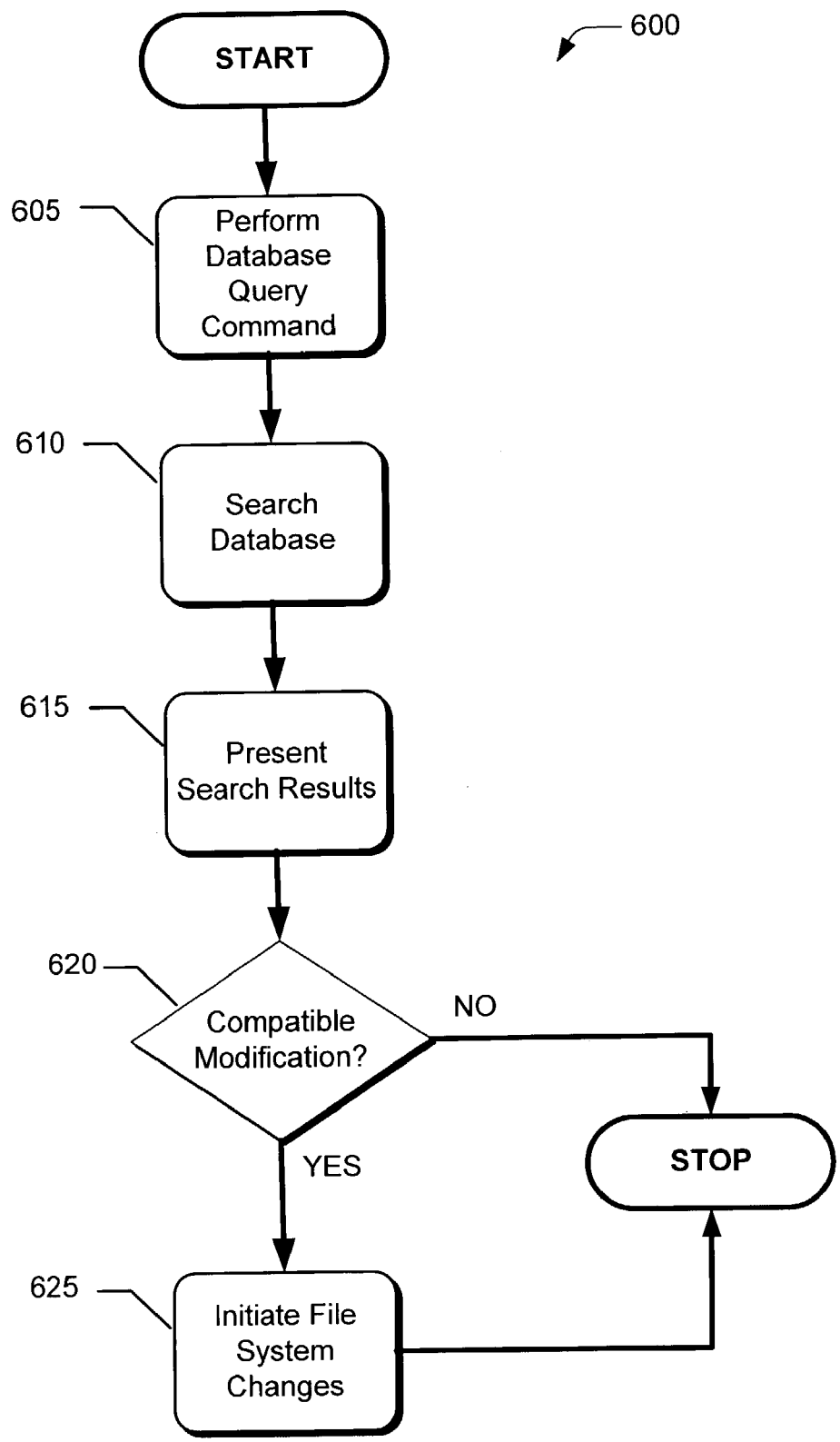
FIG. 6 is a flowchart illustrating querying a printer database and determining the ability to modify files.

FIG. 6 shows a process 600 to query a printer database and determine the ability to modify files. A printer manufacturer or a third party solution provider may need to modify printer software to accommodate a modification to an application program. In so doing software files are modified. Modifying a file may have an effect on other application programs, existing interfaces, or other software on the printer.

At block 605, the printer receives a query command to search the printer database conditioned on parameters set by the provider. The query command may be made using a database query language such as SQL. The provider desires to modify a particular file, and the query command requests all directories that the file affects.

At block 610, the printer performs a search based on the parameters set forth by the query command. The search may be directed to particular files and/or directories that meet the set parameters. Searching may make use of Boolean conditions and/or value determinative conditions (i.e., equal to, less than, or greater than a set value).

At block 615, the search result of the query command is presented by the printer. In certain cases, the search result is presented as a list of files. In other cases, the search result is presented for use by a process (i.e., routine) resident on the printer or external device such as PC. Such a process is described below in the discussion of block 620.

At block 620, a determination is made as to the compatibility of the proposed file modification with pre-existing application programs. The pre-existing application programs relate directly to the directories identified at block 615. The process ends if a pre-existing application program is adversely affected by the file modification, and the file modification is not performed (i.e., the NO branch of block 620).

If the file modification is acceptable for all pre-existing application programs (i.e., the YES branch of block 620), block 625 is performed. The file modification is accepted and file system changes are initiated as described by process 500 of FIG. 5.

Although the flow charts of FIGS. 5 and 6 show a specific order of execution, the order of execution may differ from what is depicted. All such variations are within the scope of the present invention.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A printer comprising:
    a processor;
    a file system module included in memory of the printer and executable on the processor to store software files for the printer;
    a file system manager module included in firmware for the printer and executable on the processor to receive a modification request to modify a software file for the printer as stored in the file system module, the modification request received from externally of the printer and including one of adding, deleting, and replacing the software file for the printer as stored in the file system module;
    a database module included in the memory of the printer and executable on the processor to organize interrelationships of software files for the printer stored in the file system module; and
    a database manager module included in the firmware for the printer and executable on the processor to track modifications made to the database module and update the database module regarding modifications of the software files for the printer stored in the file system module.

2. The printer of claim 1 wherein the file system manager module further initiates an event notification of the modification request after receiving the modification request.

3. The printer of claim 2 further comprising a device state tracker module executable on the processor to track the event notification.

4. The printer of claim 1 wherein the modification request is received from a third party solution provider.

5. The printer of claim 4 wherein the third party solution provider is updated in the database module.

6. The printer of claim 1 wherein the modification request is initiated by a user.

7. The printer of claim 1 wherein the interrelationships of the software files stored in the file system module include interrelationships of entities, fields, files, and directories of the software files.

8. The printer of claim 1 wherein the printer receives a query command to search for which software files the modification request affects.

9. The printer of claim 1 wherein the printer determines whether the modification request is acceptable.

10. The printer of claim 9 wherein if the modification request is acceptable, the modification request is initiated.

11. The printer of claim 9 wherein if the modification request is not acceptable, the modification request is not performed.

12. The printer of claim 4 wherein the third party solution provider is defined by one or more of a form field defining a particular form generated by the provider, a font field defining a particular font from the provider, and an access/modification rights field defining access or modification rights associated with the provider.

13. The printer of claim 1 wherein the firmware for the printer is included in the memory of the printer.

14. The printer of claim 1 wherein the firmware for the printer is separate from the memory of the printer.

* * * * *

UNITED STATES PATENT AND TRADEMARK OFFICE
CERTIFICATE OF CORRECTION

| | | |
|---|---|---|
| PATENT NO. | : 7,456,991 B2 | Page 1 of 1 |
| APPLICATION NO. | : 10/418714 | |
| DATED | : November 25, 2008 | |
| INVENTOR(S) | : Daniel Travis Lay et al. | |

It is certified that error appears in the above-identified patent and that said Letters Patent is hereby corrected as shown below:

In column 8, line 45, in Claim 1, after "of" insert -- the --.

In column 8, line 50, in Claim 1, delete "modifications" and insert -- modification --, therefor.

Signed and Sealed this

Fourth Day of August, 2009

JOHN DOLL
*Acting Director of the United States Patent and Trademark Office*